US006402355B1

(12) United States Patent
Kinouchi

(10) Patent No.: US 6,402,355 B1
(45) Date of Patent: Jun. 11, 2002

(54) VEHICULAR HEADLAMP HAVING IMPROVED LOW-BEAM ILLUMINATION

(75) Inventor: Toshiyuki Kinouchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/635,474

(22) Filed: Aug. 8, 2000

(30) Foreign Application Priority Data

Aug. 19, 1999 (JP) .......................................... 11-233310

(51) Int. Cl.[7] ................................................ B60Q 1/02

(52) U.S. Cl. ....................... 362/514; 362/538; 362/303; 362/512; 362/513; 362/517; 362/518; 362/539; 362/305

(58) Field of Search ................................ 362/538, 539, 362/305, 516–518, 303, 512, 513

(56) References Cited

U.S. PATENT DOCUMENTS 4,841,423 A * 6/1989 Luciani ...................... 362/304
5,171,082 A 12/1992 Watanabe .................... 362/61
5,406,464 A 4/1995 Saito ........................... 362/61
5,695,276 A 12/1997 Tatsukawa .................. 362/297
5,931,574 A 8/1999 Uchida ....................... 362/518
5,967,651 A * 10/1999 Neumann et al. ........... 362/538
5,980,067 A * 11/1999 Albou et al. ................ 362/303
6,000,816 A 12/1999 Serizawa et al. ........... 362/297
6,004,014 A 12/1999 Yamamura et al. ......... 362/518
6,017,138 A * 1/2000 Reiss et al. ................ 362/297
6,154,584 A * 11/2000 Tsukamoto ................. 362/465
6,168,297 B1 * 1/2001 Tatsukawa et al. ......... 362/351
6,203,177 B1 * 3/2001 Wantanabe et al. ......... 362/351
6,224,246 B1 * 5/2001 Natsume et al. ............ 362/518
6,238,072 B1 * 5/2001 Eto ........................... 362/539
6,286,985 B1 * 9/2001 Ohishio et al. ............. 362/512
6,309,089 B1 * 10/2001 Yoneyama et al. ......... 362/263
6,325,529 B1 * 12/2001 Ito ............................ 362/539

* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

A vehicular headlamp for low-beam illumination with a light distribution pattern having a horizontal cutoff line and a diagonal cutoff line so as to improve long distance visibility on the road on which the vehicle is traveling. An upward deflecting reflecting element for irradiating a beam onto a space in an area above a diagonal cutoff line is formed at the outer peripheral edge of the diagonal cutoff line forming area on a reflecting surface of a reflector. As a result, a small light distribution pattern P1 exhibiting high luminous intensity is formed in a space in the area above the diagonal cutoff line.

19 Claims, 7 Drawing Sheets

VEHICULAR HEADLAMP HAVING IMPROVED LOW-BEAM ILLUMINATION

BACKGROUND OF THE INVENTION

The present invention relates to a vehicular headlamp which provides low-beam illumination with a light distribution pattern having both a horizontal cutoff line and a diagonal cutoff line.

As is shown in FIG. 7, conventionally, as a low-beam light distribution pattern for a vehicular headlamp, a light distribution pattern P is often employed which has a horizontal cutoff line CL1 and a diagonal cutoff line CL2. In this low-beam light distribution pattern P, the horizontal cutoff line CL1 is disposed on the side closer to oncoming traffic, while the diagonal cutoff line CL2, which slopes upwards at an angle of about 15° from the horizontal cutoff line CL1, is disposed on the same side as that on which the vehicle is traveling. The intention of this arrangement is to prevent the driver of an oncoming vehicle from being blinded by glare while maintaining good forward visibility for the driver of the vehicle.

In order to obtain this type of low-beam light distribution pattern, a light source 2 is disposed coaxially with the lamp unit reference axis Ax that extends in the longitudinal direction of the vehicle, and light from this light source 2 is reflected forward by a reflector 4.

However, when employing a light distribution pattern having a horizontal cutoff line CL1 and a diagonal cutoff line CL2 as the light distribution pattern P for the low beam, the long distance visibility may be insufficient for some drivers.

SUMMARY OF THE INVENTION

In view of the foregoing, it is an object of the present invention to provide a vehicular headlamp which performs low-beam illumination with a light distribution pattern having both a horizontal cutoff line and a diagonal cutoff line in such a manner as to improve the long distance visibility on the road on which the vehicle is traveling.

The present invention achieves the above object by forming a predetermined upward deflecting reflecting element on the reflecting surface of a reflector.

Namely, in accordance with the invention a vehicular headlamp is provided having a light source disposed substantially coaxial with a lamp unit axis that extends in the longitudinal direction of the vehicle and a reflector for reflecting light from the light source forward. The reflector is constructed to perform low-beam illumination in a light distribution pattern having a horizontal cutoff line and a diagonal cutoff line that slopes upwards at an angle of about 15° from the horizontal cutoff line towards the road on which the vehicle is traveling. The vehicular headlamp of the invention is characterized in that an upward deflecting reflecting element for irradiating a beam towards a space in an area above the diagonal cutoff line is formed on an outer peripheral edge of the reflecting surface.

The above "light source" is not limited to any specific type so long as it is disposed substantially coaxial with the lamp unit reference axis. For example, the light source may be a filament such that of a halogen bulb, or the discharge light emission portion of a discharge bulb may be used.

The shape of the profile and the shape of the surface of the above "upward deflecting reflecting element" is not particularly limited so long as it is formed to irradiate a beam onto the space around the area above the diagonal cutoff line.

The phrase "to irradiate a beam onto the space around the area above the diagonal cutoff line" not only refers to the case in which the beam is irradiated only to the space around the area above the diagonal cutoff line, but also to the case in which the beam is irradiated from the space around the area above the diagonal cutoff line to the space around the area above the horizontal cutoff line.

With the above-described structure, the vehicular headlamp according to the present invention provides low-beam illumination with a light distribution pattern having horizontal and diagonal cutoff lines. The upward deflecting reflecting element is formed at the outer peripheral edge portion of the reflecting surface of a reflector for irradiating the beam onto the space around the area above the diagonal cutoff line, thus providing the operational effects described below.

Generally the light distribution pattern formed by light reflected from the outer peripheral edge portion of the reflecting surface is small and and it exhibits a high luminous intensity. Therefore, if the upward deflecting reflecting element is formed at the outer peripheral edge portion of the reflecting surface, it is possible to irradiate a beam that forms a small light distribution pattern exhibiting high luminous intensity in the space around the area above the diagonal cutoff line.

As a result, according to the present invention, the long distance visibility on the road on which the vehicle is traveling can be improved for a vehicular headlamp structured to perform low-beam illumination in a light distribution pattern having a horizontal cutoff line and a vertical cutoff line.

Moreover, further in accordance with the present invention, the upward deflecting reflecting element is formed at the outer peripheral edge of the reflecting surface such that a light distribution pattern having a high luminous intensity can be formed. Accordingly, it is possible to obtain the desired beam for increasing the long distance visibility on the road on which the vehicle is traveling simply by constructing the upward deflecting reflecting element as an extremely small area.

In the above-discussed structure, the illumination angle and brightness of the beam that is irradiated onto the space in the area above the diagonal cutoff line are not limited so long as they allow the desired increase in long distance visibility on the road on which the vehicle is traveling. If, however, the beam illumination provides an luminance of 0.8 lux or more at a distance 25 meters to the front of the lamp unit in the direction about 0.5° above the lamp unit reference axis and about 1° towards the road on which the vehicle is traveling, the desired increase in the long distance visibility thereon is assured.

There is no particular limitation concerning the position at which the upward deflecting reflecting element is formed so long as it is on the outer peripheral edge portion of the reflecting surface. However, if the upward deflecting reflecting element is formed within an angle range of not more than about 30° above the lamp unit reference axis, it is possible to obtain the beam needed to increase the long distance visibility on the road on which the vehicle is traveling with a small upward deflection angle. As a result, the long distance visibility on the road on which the vehicle is traveling can be increased without exerting an excessive burden on the shape of the reflecting surface. The upward deflecting reflecting element may be formed on either the left or right side of the lamp unit reference axis, or an upward deflecting reflecting element may be formed on both sides of the lamp unit reference axis.

If the upward deflecting reflecting element is constructed to deflect light from the light source for upward reflection by 1° to 2°, the long distance visibility on the road on which the vehicle is traveling can be increased without requiring upward illumination over an unnecessarily wide range.

Provision of the upward deflecting reflecting element as described above makes it possible to improve the long distance visibility on the road on which the vehicle is traveling. However, the contrary situation may also be considered. That is, it may be preferred to give precedence to preventing any possibility of increasing the glare inflicted on pedestrians walking along the road, rather than to improving the long distance visibility.

In order to cope with such conflicting situations as described above, the lamp unit may be provided with a shade for shading light emitted from the light source onto the upward deflecting reflecting element. The shade may be selectively used depending upon the situation at hand, that is, either giving precedence to improving the long distance visibility or preventing the possibility of increasing the glare inflicted on pedestrians, while keeping the basic structure of the lamp unit common.

In the above case, for a lamp unit structure that gives precedence to improving the long distance visibility, the shade is no longer an essential structural element. However, the shade is effective for other purposes as well, for example, for the purpose of shading direct light irradiated from the light source to the front of the lamp unit. In cases such as this, partial modification of the shade structure may easily change the lamp unit structure to the one used to give precedence to prevent infliction of glare on pedestrians.

DESCRIPTION OF THE PREFERRED EMBODIMENTS

Figure 1:
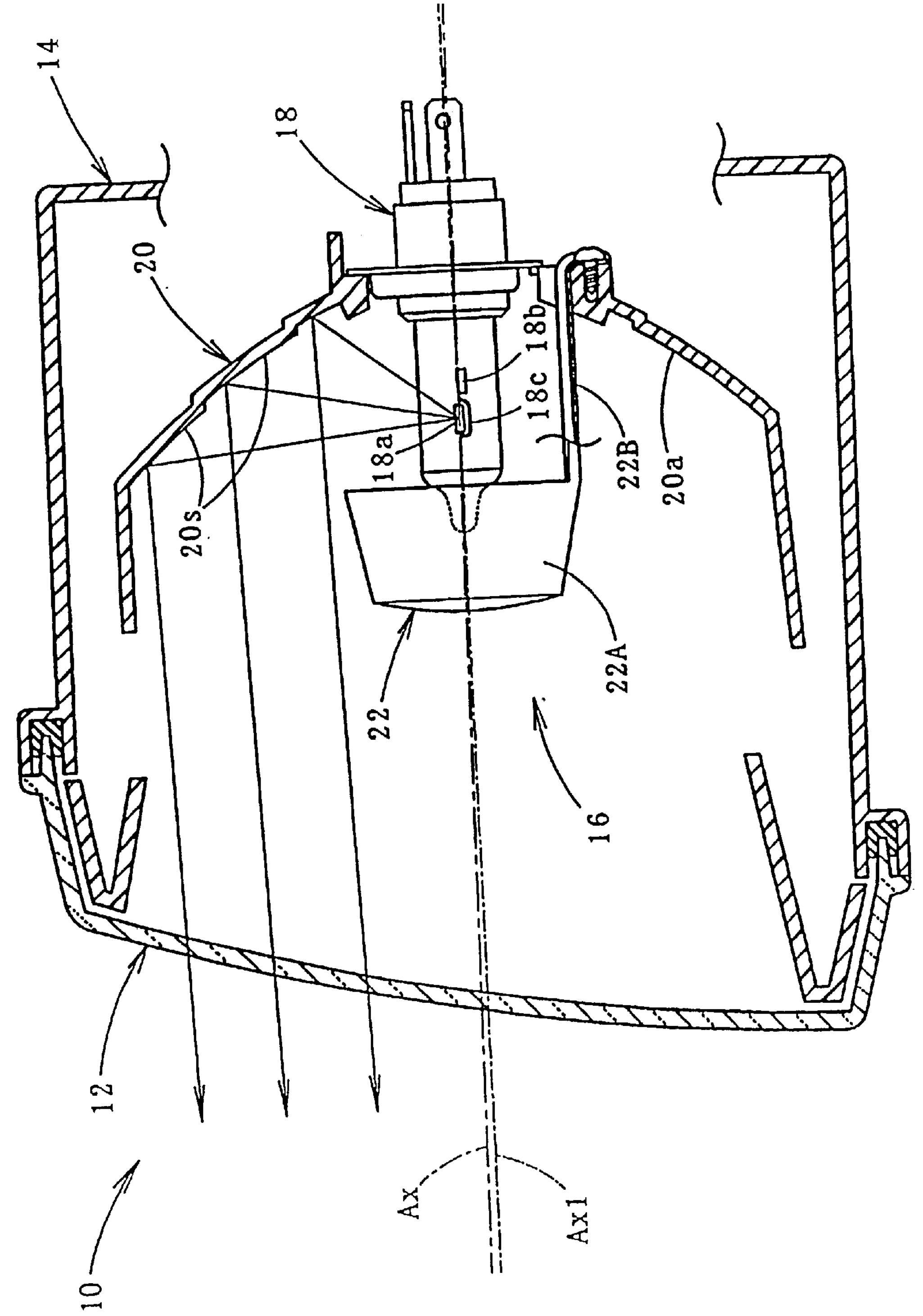
FIG. 1 is a sectional side elevational view showing a vehicular headlamp constructed according to a first embodiment of the present invention.

Preferred embodiments of the present invention will now be described referring to the drawings.

A first embodiment of the invention will be described with reference to FIGS. 1 through 3 of the drawings.

FIG. 1 is a cross-sectional view taken from the side showing the vehicular headlamp 10 according to the first embodiment of the present invention.

As shown in this drawing, the vehicular headlamp 10 according to the present embodiment has a reflector unit 16 disposed in a lamp chamber defined by a transparent front lens 12 and a lamp body 14. The optical axis Ax1 of the reflector unit 16 is set to be titled slightly downward (i.e., approximately by 0.5° to 0.6°) relative to the lamp unit reference axis Ax extending in the longitudinal direction of the vehicle when the reflector unit 16 is in a reference position.

The reflector unit 16 is provided with a light source bulb 18, a reflector 20, and an outer shade 22. The light source bulb 18 is a halogen bulb provided with two filaments (light sources) 18*a*, 18*b* extending in the direction of the optical axis Ax1, and an inner shade 18*c* that surrounds the front filament 18*a* at a central angle of 165° around the optical axis Ax1 so as to shade light directed downwards from the filament 18*a*. The filament 18*a* is fixed and supported by the reflector 20 so as to be coaxial with the optical axis Ax1.

The reflector 20 is provided with a reflecting surface 20*a* including a plurality of reflecting elements 20*s* formed on a paraboloid of revolution having the optical axis Ax1 as the central axis thereof. Light from the filament 18*a* or 18*b* is diffused and deflected for forward reflection against the reflecting surface 20*a*. Low-beam illumination is performed by illuminating the filament 18*a*, while high-beam illumination is performed by illuminating the filament 18*b*.

The outer shade 22 is composed of a cap portion 22A that surrounds the front end portion of the light source bulb 18 so as to shade direct light to the front of the lamp unit from the filament 18*a*, and a support portion 22B for supporting the cap portion 22A. The rear end portion of the stay portion 22B is fixed to the reflector 20.

Figure 2:
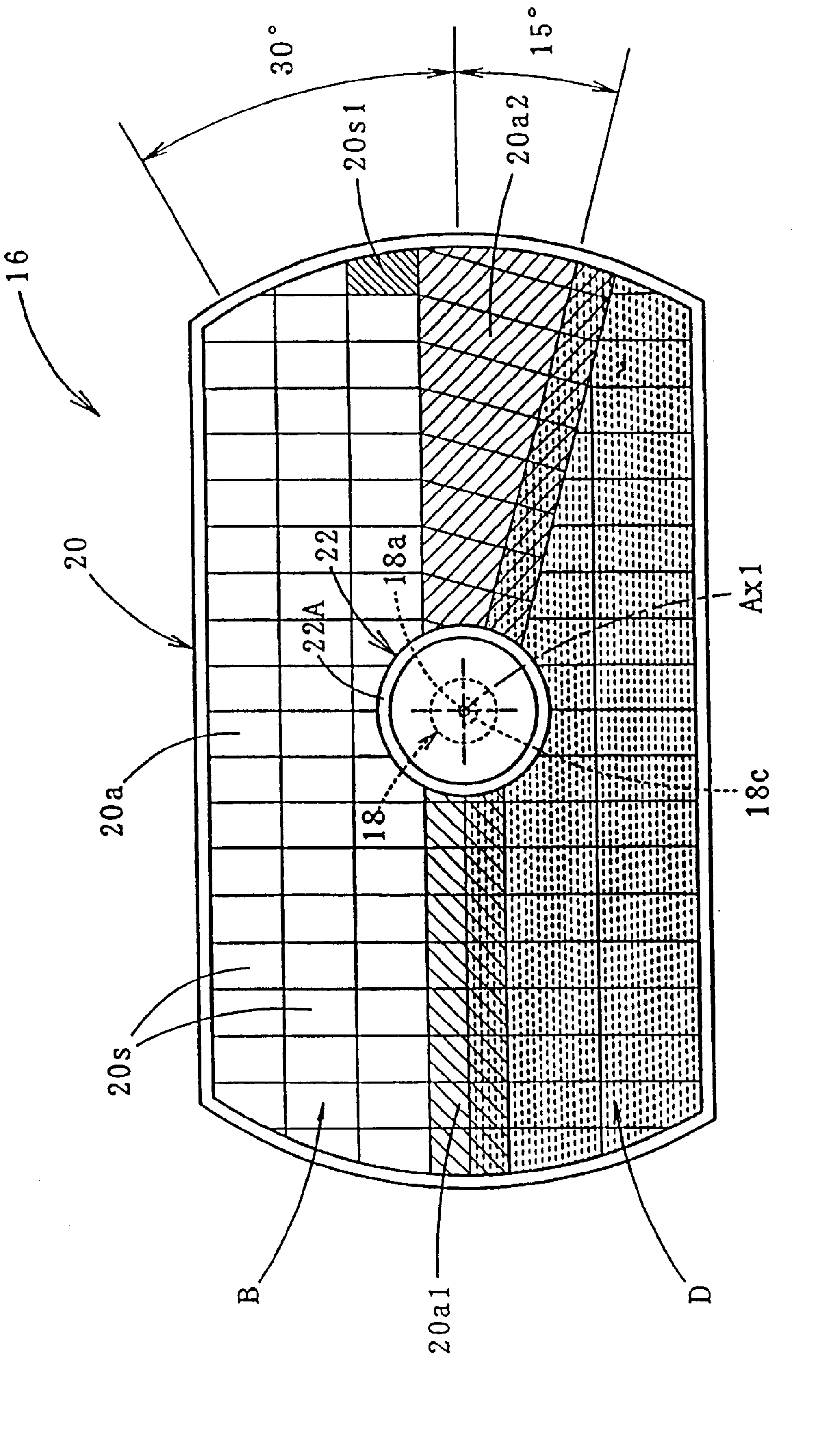
FIG. 2 is a front elevational view showing a separate reflector unit of the vehicular headlamp of the first embodiment of the present invention.

Referring now to FIG. 2 which is a front view showing a single reflector unit 16, on the reflecting surface 20*a* of the reflector 20 the area D, indicated by dashed lines, is a light non-incident area where light from the filament 18*a* is shaded by the internal shade 18*c* so as not to be incident on the area D. The area B, namely the area other than the area D, is a light incident area onto which light is irradiated from the filament 18*a*.

Figure 3:
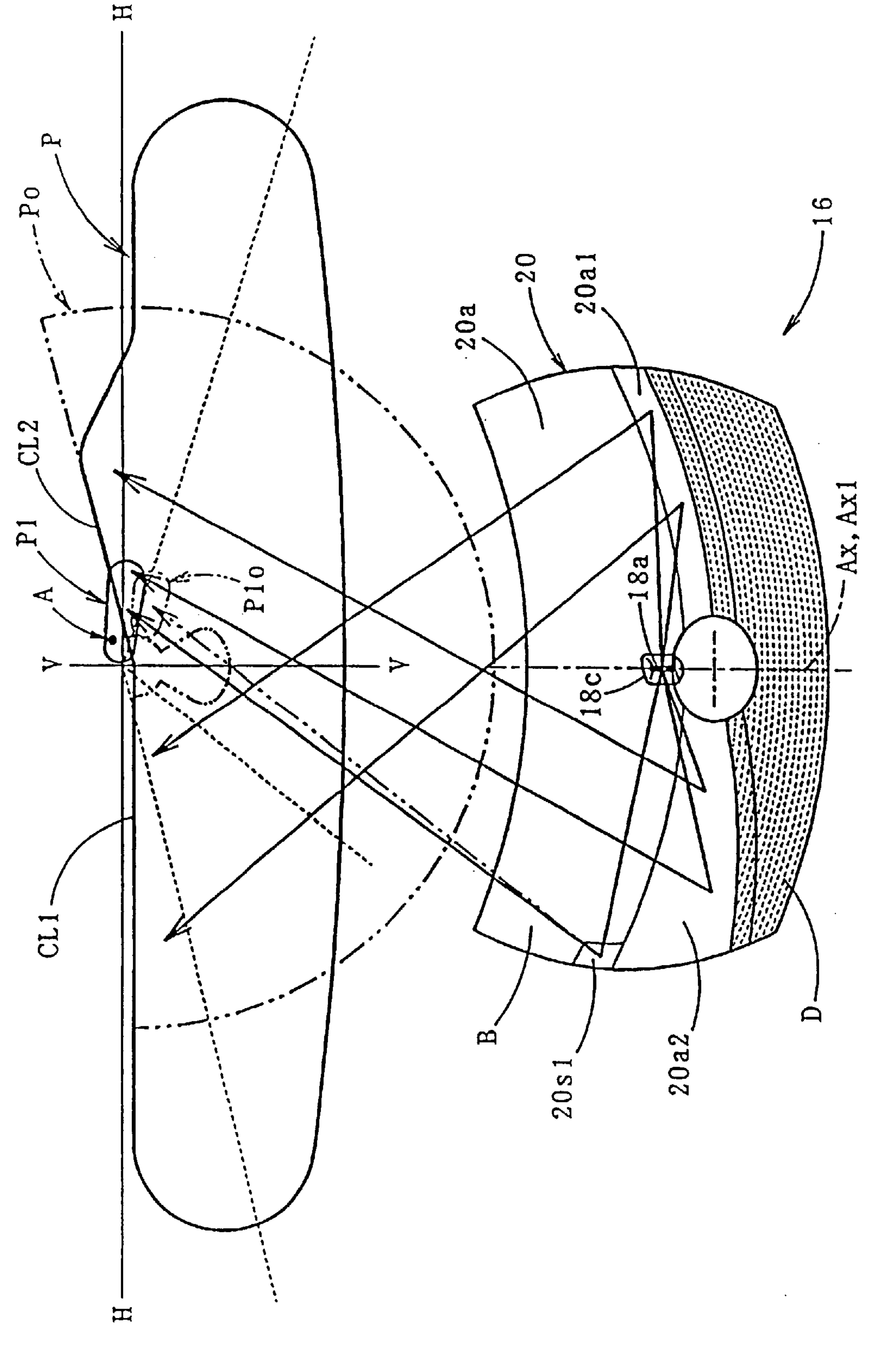
FIG. 3 is a diagrammatic view from the rear face of a reflector unit showing a low-beam light distribution pattern formed on a vertical screen positioned 25 meters to the front of the lamp unit by low-beam illumination from the vehicular headlamp together with the reflector unit according to the first embodiment of the present invention.

FIG. 3 depicts a reflector unit 16 in a diagrammatic view from the back face of the reflector unit 16 showing a low-beam light distribution pattern P formed by low-beam illumination from the vehicular headlamp 10 on a vertical screen 25 meters apart from the front of the lamp.

As can be seen from this drawing, the low-beam light distribution pattern P is a low-beam light distribution pattern for light distribution on the right side of the vehicle. The light distribution pattern P has a horizontal cutoff line CL1 on the left side of a line V—V (a vertical line passing through the lamp unit reference axis Ax), and a diagonal cutoff line CL2 sloping upward at an angle of about 15° from the horizontal cutoff line CL1 on the right side of the line V—V. The horizontal cutoff line CL1 is formed below the line H—H by a distance determined by the angular difference between the lamp unit reference axis Ax and the optical axis Ax1.

The basic light distribution pattern Po shown by the chain double-dashed line in the drawing is a low-beam light distribution pattern formed on the assumption that the reflecting surface 20*a* of the reflector 20 is a paraboloid of revolution with the optical axis Ax1 as the central axis thereof. The low-beam light distribution pattern P shown by the solid line is formed when the basic light distribution pattern Po is modified by the diffused deflection reflecting function of the plurality of reflecting elements 20*s* formed on the reflecting surface 20*a*.

As is shown by the diagonal lines in FIG. 2, a horizontal cutoff line forming area 20*a*1 and a diagonal cutoff line forming area 20*a*2 are formed on both the left and right sides of the optical axis Ax1 on the reflecting surface 20*a* so as to overlap the boundary line between the light incident area B and the light non-incident area D. The horizontal cutoff line CL1 and the diagonal cutoff line CL2 are determined in accordance with the diffused deflection reflecting function of the reflecting elements 20*s* constituting the horizontal and diagonal cutoff line forming areas 20*a*1, 20*a*2.

One reflecting element 20*s*1 (the reflecting element shown by the diagonal lines in FIG. 2) that is adjacent to the top of the diagonal cutoff line forming area 20*a*2 at the left side outer peripheral edge of the reflecting surface 20*a* is formed so as to reflect light from the filament 18*a* in direction higher than the direction in which light is reflected by the other reflecting elements 20*s* adjacent to the reflecting element 20*s*1. As a result, a beam is irradiated which forms a light distribution pattern P1 that projects upward from the diagonal cutoff line CL2.

The beam diffusion angle of the beam that forms the light distribution pattern P1 is set to provide a luminance of 0.8 lux or more at a distance 25 meters to the front of the lamp unit in the direction 0.5° above the lamp unit reference axis Ax and 1° towards the road on which the vehicle is traveling (i.e., towards the right side) relative to the lamp unit reference axis Ax (i.e., in the direction indicated by the point A in FIG. 3). Namely, the light distribution pattern P1 is formed by deflecting upward by approximately 1 to 2° and slightly diffusing the segment pattern P1o laterally in the position indicated by the chain double-dashed line in the basic light distribution pattern Po.

As described above in detail, in the vehicular headlamp 10 according to the present embodiment, an upward deflecting reflecting element 20*s*1 for irradiating a beam towards the space in the area above the diagonal cutoff line CL2 is formed at the outer peripheral edge of the diagonal cutoff line forming area 20*a*2 side of the reflecting surface 20*a* of the reflector 20. As a result, the following operational effects are obtained.

The light distribution pattern formed by the light reflected from the outer peripheral edge of the reflecting surface 20*a* has a high luminous intensity and a small size. The upward deflecting reflecting element 20*s*1 is formed at the outer peripheral edge of the diagonal cutoff line forming area 20*a*2 of the reflecting surface 20*a* so as to irradiate a beam which forms a small light distribution pattern P1 exhibiting high luminous intensity onto the space in the area above the diagonal cutoff line 20*s*1. This makes it possible to improve the long distance visibility on the road on which the vehicle is traveling.

In the present embodiment, the upward deflecting reflecting element 20*s*1 is formed at the outer peripheral edge of a reflecting surface 20*a* so as to form a distribution pattern exhibiting high luminous intensity. Therefore, it is possible to obtain the beam required for improving the long distance visibility simply by making the upward deflecting reflecting element 20*s*1 an extremely small area.

In the present embodiment, the beam irradiated onto the space in the area above the diagonal cutoff line CL2 is formed to obtain a luminance of 0.8 lux or greater at a distance 25 meters to the front of the lamp unit at 0.5° above the lamp unit reference axis Ax and 1° relative to the lamp unit reference axis Ax towards the road on which the vehicle is traveling. As a result, the long distance visibility on the road on which the vehicle is traveling is significantly improved.

Further, as the upward deflecting reflecting element 20*s*1 is formed at an angular position on the reflecting surface 20*a* approximately 5 to 10° above the optical axis Ax1, it is possible to form the segment pattern P1o in the area downward of the diagonal cutoff line CL2. As a result, it is possible to obtain the beam required for forming the light distribution pattern P1 for improving long distance visibility on the road on which the vehicle is traveling using only a small upward deflection angle. Therefore, the long distance visibility on the road on which the vehicle is traveling can be increased without exerting any excessive burden on the shape of the reflecting surface 20*a*. With the upward deflection angle of the upward deflecting reflecting element 20*s*1 set at approximately 1°, the long distance visibility on the road on which the vehicle is traveling can be improved without effecting upward irradiation over an unnecessarily wide range.

If the upward deflecting reflecting element 20*s*1 is formed on the reflecting surface 20*a* at an angular position greater than 10° above the optical axis Ax1, the position of the segment pattern P1o shifts downward of the position shown in FIG. 3. Therefore, corresponding to the shifting, the upward deflection angle of the upward deflecting reflecting element 20*s*1 may be set to a value greater than 1°.

Figure 4:
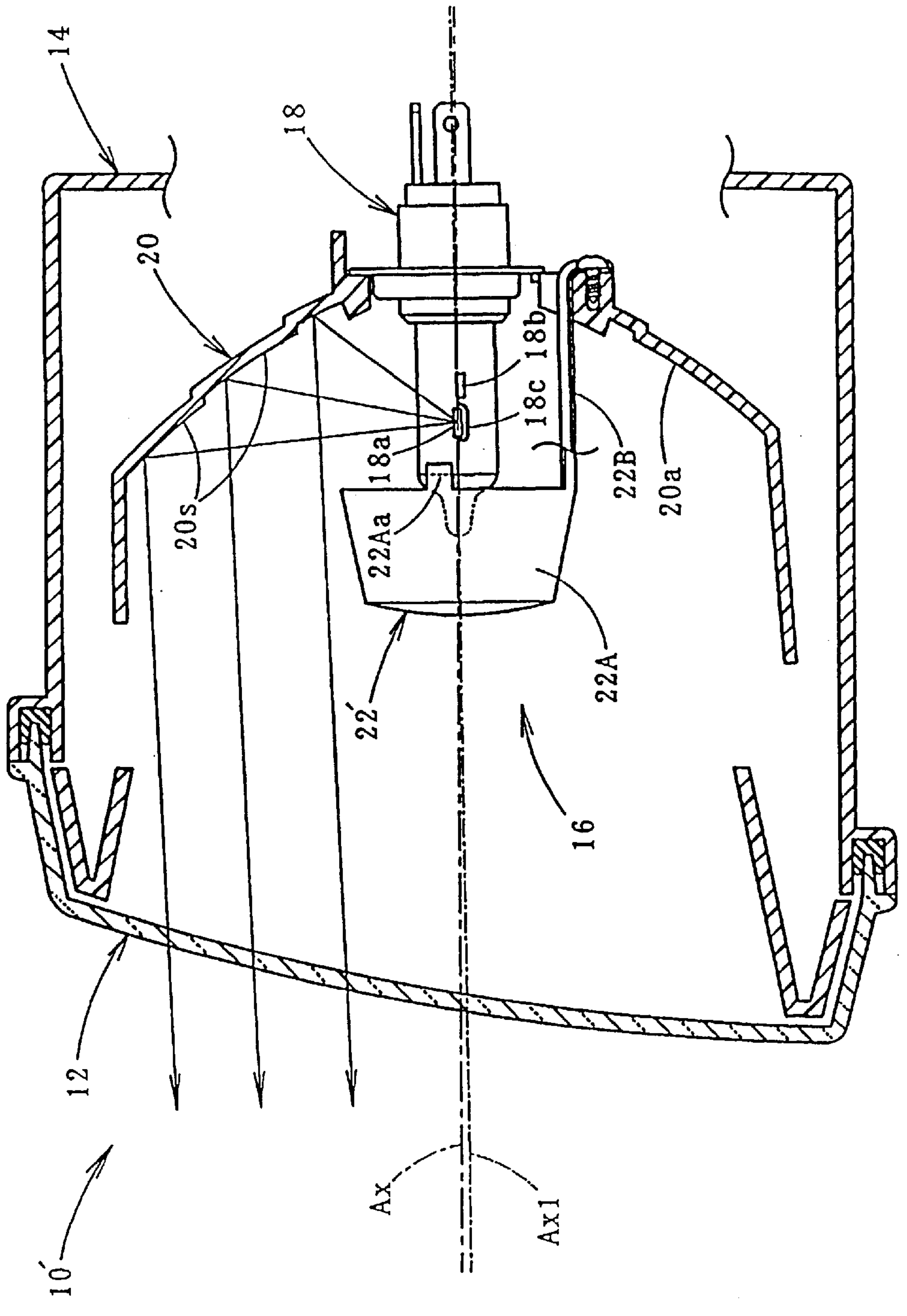
FIG. 4 is a sectional side elevational view as seen from the side showing a vehicular headlamp constructed according to a second embodiment of the present invention.
Figure 5:
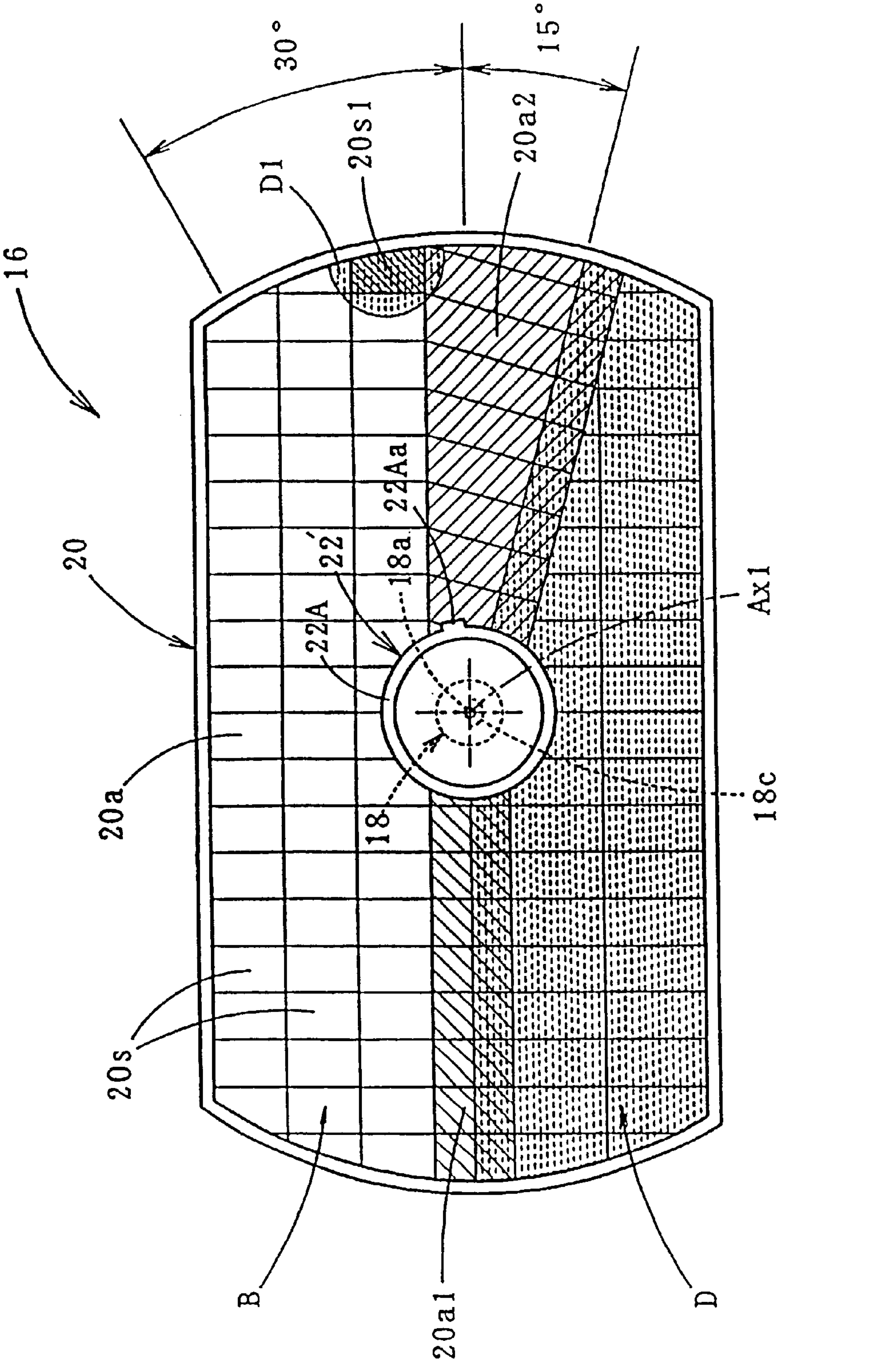
FIG. 5 is a front elevational view showing a separate reflector unit of the vehicular headlamp according to the second embodiment of the present invention.
Figure 6:
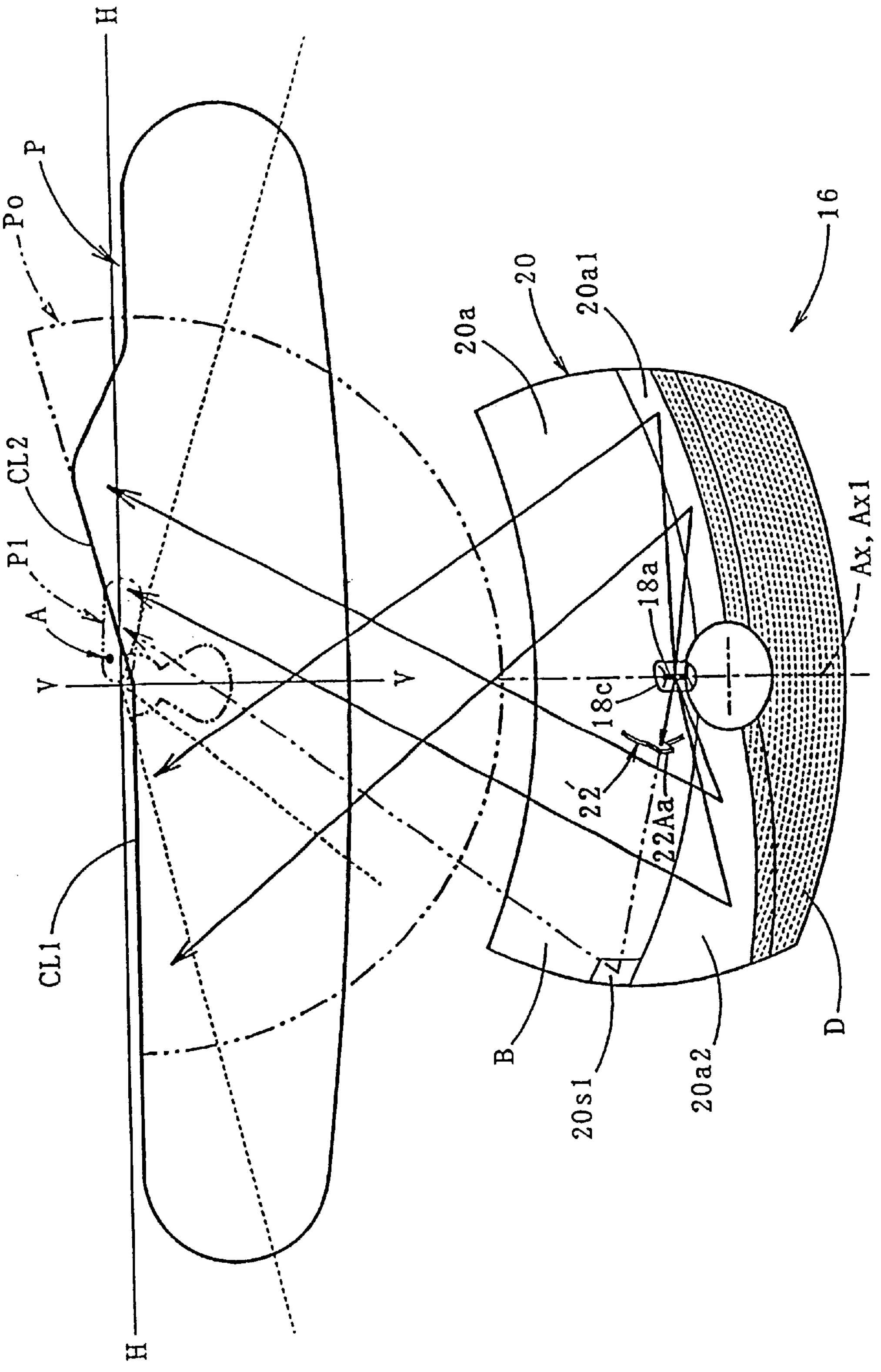
FIG. 6 is a view seen transparently from the rear face of a reflector unit showing a low-beam light distribution pattern formed on a vertical screen positioned 25 meters to the front of the lamp unit by low-beam illumination from the vehicular headlamp together with the reflector unit according to the second embodiment of the present invention.
Figure 7:
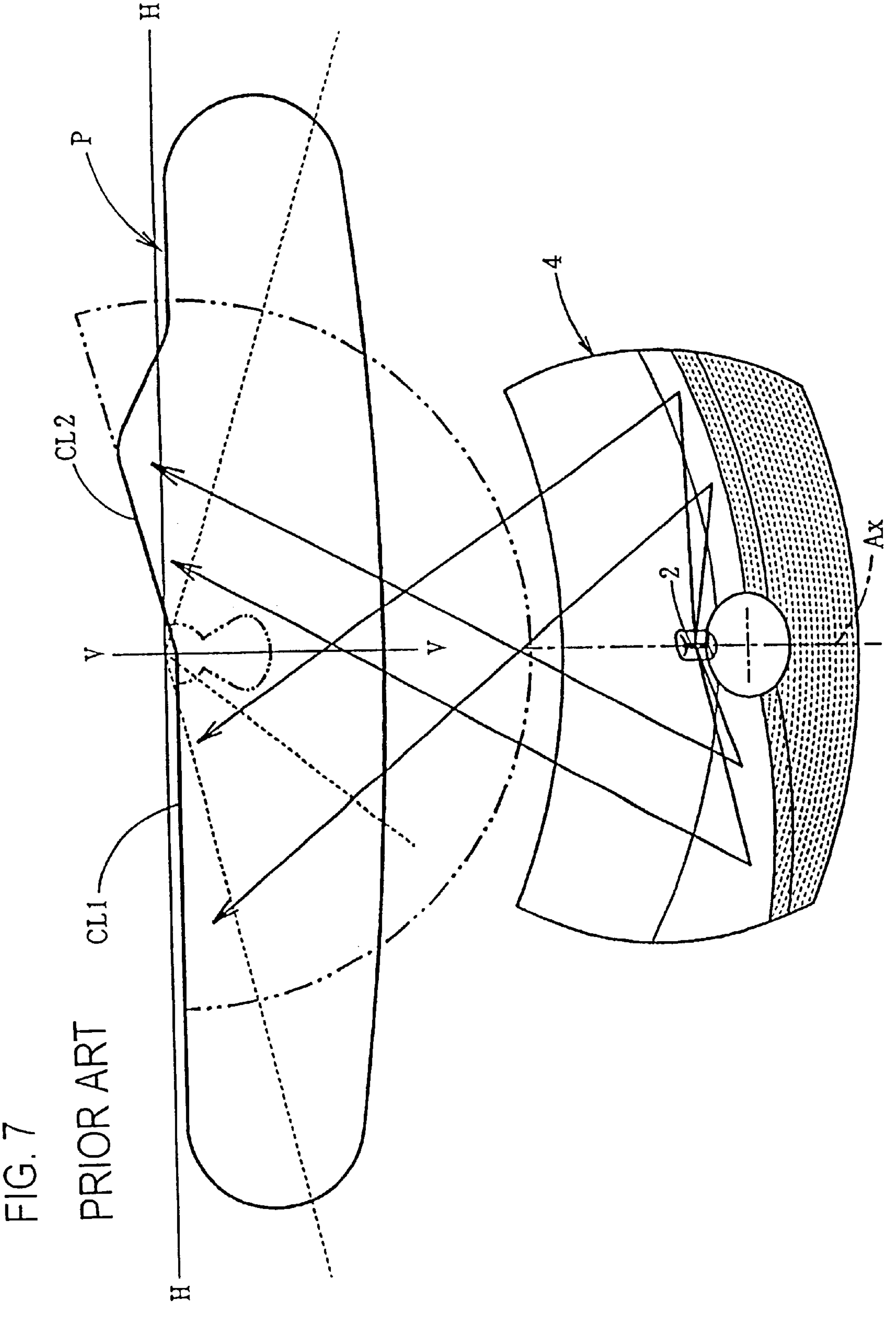
FIG. 7 PRIOR ART
FIG. 7 shows a conventional vehicular headlamp in a view corresponding to FIGS. 3 and 6.

Next, the second embodiment of the present invention will be described with reference to FIGS. 4, 5, and 6, which are views corresponding to FIGS. 1, 2, and 3 of the first embodiment.

As shown in these drawings, the vehicular headlamp 10' according to this embodiment has structure identical to the first embodiment except that the structure of the outer shade 22' is different from that of the outer shade 22 thereof.

More specifically, in this embodiment, a portion 22A*a* protruding rearward is formed at the rear edge of the cap portion 22A of the outer shade 22'. The protruding portion 22A*a* is formed at a position on the left side of the rear edge of the cap portion 22A slightly above the optical axis Ax1. This serves to shield direct light from the filament 18*a* shining on the upward deflecting reflecting element 20*s*1. Namely, the area D1 (indicated by the dashed lines in FIG. 5) that covers the upward deflecting reflecting element 20*s*1 is formed as a light non-incident area by the shading function of the protruding portion 22A*a*.

The use of this type of the outer shade 22' provides the following operational effects.

The first embodiment gives precedence to improving long distance visibility on the road on which the vehicle is traveling by the provisions of the upward deflecting reflecting element 20*s*1. On the contrary, however, there may be a conflicting demand to give precedence to preventing any possibility of increasing the glare inflicted on pedestrians walking along the road on which the vehicle is traveling. Therefore, in that case, the outer shade 22' is provided in place of the outer shade 22 of the first embodiment. This provides a low-beam light distribution pattern P having no light distribution pattern P1 in the space in the area above the diagonal cutoff line 20*s*1.

Also, a shade can be selected having a structure between the outer shade 22 and the outer shade 22', while keeping the basic structure of the lamp unit common. Therefore, the present invention is able to cope with the demand of conflicting requirements, that is, improvement of the long distance visibility and prevention of glare on pedestrians.

In the above-described embodiments, the upward deflecting reflecting element **20*s*1 is formed at the diagonal cutoff line forming area 20*a*2 of the reflecting surface 20*a*. However, by employing the same structure as in the above embodiments, the same operational effects as in the above embodiments can be obtained even if the upward deflecting reflecting element 20*s*1 is formed at the horizontal cutoff line forming area side 20*a*1 of the reflecting surface 20*a***.

The embodiments above were described with respect to the case where the lamp unit structure is designed to obtain a low-beam light distribution pattern P for right-side light distribution. However, by reversing the left and right sides of the lamp unit structure of the above embodiments, it is possible to obtain a low-beam light distribution pattern for left-side light distribution laterally symmetrical with the above low-beam light distribution pattern P. In cases such as this as well the same operational effects can be obtained as in each of the above embodiments.

In the above embodiments, a two-lamp type headlamp for selectively performing low-beam illumination and high-beam illumination using a single lamp unit is described. However, it is possible to obtain the same operational effects as in the above embodiments by employing the same structure as discussed above for a dedicated low-beam illumination lamp structure in a four-lamp type headlamp.

What is claimed is:

1. A vehicular headlamp having a reference axis extending in a longitudinal direction of a vehicle on which said headlamp is mounted, comprising:

a light source;

a reflector for reflecting light from said light source forward and providing low-beam illumination in a light distribution pattern having a horizontal cutoff line and a diagonal cutoff line that slopes upwards at an angle of about 15° from said horizontal cutoff line; and an upward deflecting reflecting element for irradiating a beam towards a space in an area adjacent to said reference axis and above said diagonal cutoff line, said upward deflecting element being disposed on an outer peripheral edge of a reflecting surface of said reflector.

2. The vehicular headlamp according to claim 1, wherein the beam irradiation towards said space in said area above said diagonal line provides a luminance of at least 0.8 lux at a distance 25 meters to the front of said headlamp at 0.5° above said reference axis of said headlamp and 1° towards the road on which the vehicle is traveling.

3. The vehicular headlamp according to claim 1, wherein said upward deflecting reflecting element is disposed within an angular range of not more than 30° around said reference axis of said headlamp.

4. The vehicular headlamp according to claim 2, wherein said upward deflecting reflecting element is disposed within an angular range of not more than 30° around said reference axis of said headlamp.

5. The vehicular headlamp according to claim 1, further comprising a shade for shading incident light from said light source onto said upward deflecting reflecting element.

6. The vehicular headlamp according to claim 1, further comprising a shade, said shade comprising a cap-shaped portion surrounding a front end portion of said light source and shading direct light to the front of said headlamp from said light source, a support portion for supporting said cap portion, a rear end portion of said support portion being fixed to said reflector, and a protruding portion disposed at a position on a side of a rear edge of said cap portion slightly above an optical axis of said reflector for shielding direct light from said light source onto said upward deflecting element.

7. The vehicular headlamp according to claim 6, wherein the beam irradiation towards said space in said area above said diagonal line provides a luminance of at least 0.8 lux at a distance 25 meters to the front of said headlamp at 0.5° above said reference axis of said headlamp and 1° towards the road on which the vehicle is traveling.

8. The vehicular headlamp according to claim 6, wherein said upward deflecting reflecting element is disposed within an angular range of not more than 30° around said reference axis of said headlamp.

9. The vehicular headlamp according to claim 5, wherein said upward deflecting reflecting element is disposed within an angular range of not more than 30° around said reference axis of said headlamp.

10. The vehicular headlamp according to claim 5, wherein said shade surrounds said light source at an angle of 165° around an optical axis of said reflector.

11. The vehicular headlamp according to claim 1, wherein said light source is disposed substantially coaxial with an optical axis of said reflector.

12. A vehicular headlamp comprising:

a light source;

a reflector for reflecting light from said light source forward and providing low-beam illumination in a light distribution pattern having a horizontal cutoff line and a diagonal cutoff line that slopes upwards at an angle of about 15° from said horizontal cutoff line;

an upward deflecting reflecting element for irradiating a beam towards a space in an area above said diagonal cutoff line, said upward deflecting element being disposed on an outer peripheral edge of a reflecting surface of said reflector; and a shade for shading incident light from said light source onto said upward deflecting reflecting element, wherein said upward deflecting reflecting element is disposed within an angular range of not more than 30° around a reference axis of said headlamp.

13. The vehicular headlamp according to claim 12, said shade comprising a cap-shaped portion surrounding a front end portion of said light source and shading direct light to the front of said headlamp from said light source, a support portion for supporting said cap portion, a rear end portion of said support portion being fixed to said reflector, and a protruding portion disposed at a position on a side of a rear edge of said cap portion slightly above an optical axis of said reflector for shielding direct light from said light source onto said upward deflecting element.

14. The vehicular headlamp according to claim 12, wherein said shade surrounds said light source at an angle of 165° around an optical axis of said reflector.

15. The vehicular headlamp according to claim 12, wherein said light source is disposed substantially coaxial with an optical axis of said reflector.

16. A vehicular headlamp comprising:

a light source;

a reflector for reflecting light from said light source forward and providing low-beam illumination in a light distribution pattern having a horizontal cutoff line and a diagonal cutoff line that slopes upwards at an angle of about 15° from said horizontal cutoff line;

an upward deflecting reflecting element for irradiating a beam towards a space in an area above said diagonal cutoff line, said upward deflecting element being disposed on an outer peripheral edge of a reflecting surface of said reflector; and a shade for shading incident light from said light source onto said upward deflecting reflecting element, wherein the beam irradiation towards said space in said area above said diagonal line provides a luminance of at least 0.8 lux at a distance 25 meters to the front of said headlamp at 0.5° above said reference axis of said headlamp and 1° towards the road on which the vehicle is traveling.

17. The vehicular headlamp according to claim 16, said shade comprising a cap-shaped portion surrounding a front end portion of said light source and shading direct light to the front of said headlamp from said light source, a support portion for supporting said cap portion, a rear end portion of said support portion being fixed to said reflector, and a protruding portion provided at a position on a side of a rear edge of said cap portion slightly above an optical axis of said reflector for shielding direct light from said light source onto said upward deflecting element.

18. The vehicular headlamp according to claim 16, wherein said shade surrounds said light source at an angle of 165° around an optical axis of said reflector.

19. The vehicular headlamp according to claim 16, wherein said light source is disposed substantially coaxial with an optical axis of said reflector.

* * * * *